Figure 1:
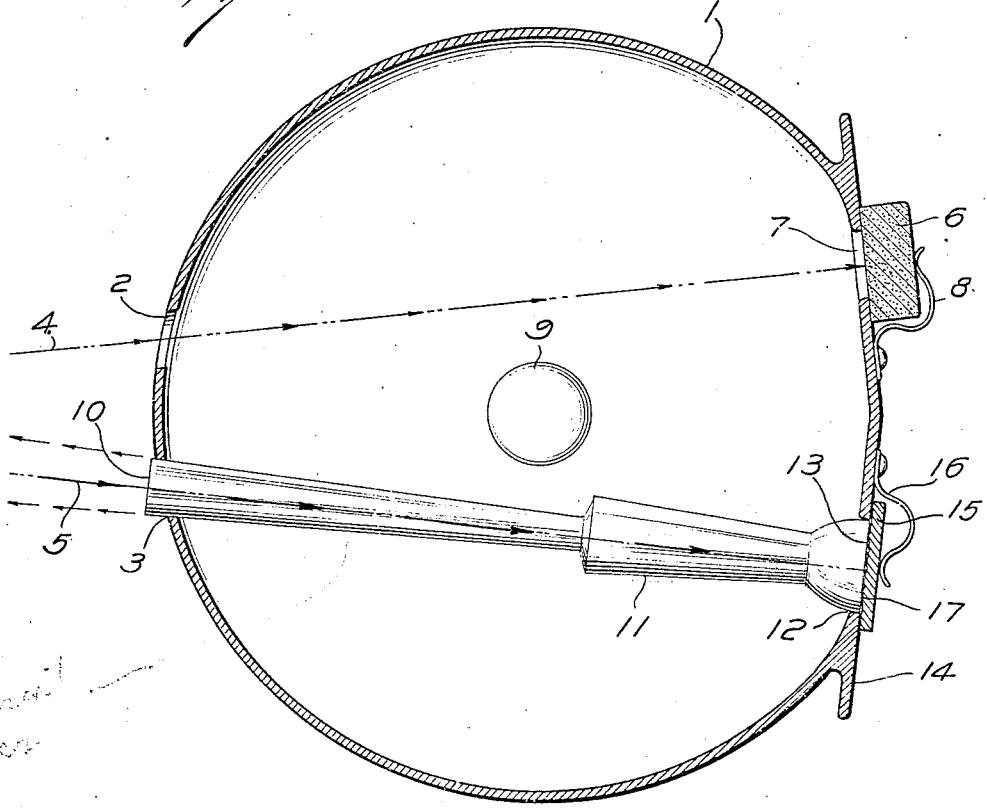

Aug. 21, 1945. W. A. SHURCLIFF 2,383,346
SPECTROPHOTOMETER ATTACHMENT FOR ELIMINATING SPECULAR REFLECTION
Filed May 20, 1944

INVENTOR
WILLIAM A. SHURCLIFF,
BY Elmer W. Harmon
ATTORNEY

Patented Aug. 21, 1945

2,383,346

UNITED STATES PATENT OFFICE 2,383,346

SPECTROPHOTOMETER ATTACHMENT FOR ELIMINATING SPECULAR REFLECTION

William A. Shurcliff, Washington, D. C., assignor to American Cyanamid Company, New York, N. Y., a corporation of Maine Application May 20, 1944, Serial No. 536,542

1 Claim. (Cl. 88—14)

This invention relates to an apparatus for measuring the body reflectance of a specularly-reflecting sample, and constitutes a continuation-in-part of the subject matter contained in my original application for United States Letters Patent Serial No. 430,718 filed February 13, 1942, now U. S. Letters Patent No. 2,364,825.

In the past considerable information with regard to the composition of various samples has been obtainable through the use of flickering-beam type recording spectrophotometers. Examples of such spectrophotometers are well illustrated in U. S. Letters Patent No. 2,107,836 and 2,126,410 issued on February 8, 1938 and August 9, 1938 respectively, to Orrin W. Pineo. Even the best of such spectrophotometers, however, will not give immediately useful readings with samples having a high gloss such as hard finished papers, certain inks, lacquers, paints, molded resins, ceramics, and other materials exhibiting similar phenomena. It is usually desirable to determine the body reflectance dependent upon the structure or composition of the material itself rather than the total reflectance which is obtained when a sample is run in a conventional type apparatus. In the case of samples where there is an appreciable surface gloss, specularly reflected light may comprise a large or even a major proportion of the total reflectance of the sample at a given wavelength.

As pointed out, the specularly reflected light may comprise a major portion of the total reflectance. In addition it should be brought out that in most circumstances there is a certain minimum below which the total reflectance will never fall however low the body reflectance. For example, with plastics such as "Bakelite" this minimum usually occurs somewhere about 4%. Therefore, when only the body reflectance is desired, the readings obtained from a conventional type apparatus with the sample held in the conventional manner may be in error by 4% or more even with a very light sample. With dark samples the error will often be appreciably more than 50%. It is therefore readily apparent that for many purposes the elimination of this surface reflectance becomes highly important.

There are two principal methods of eliminating the specularly reflected light from the reading obtained with the spectrophotometer. The first of these is to reject specularly reflected light coming from the surface of the sample from the interior of the integrating sphere, as shown in my above noted original application of which the present subject matter is a continuation-in-part.

The second of these comprises the provision of some means within the integrating sphere for eliminating the effect of the specular reflectance, which forms the subject matter of my copending application, Serial No. 430,720, filed February 13, 1942, now U. S. Letters Patent No. 2,347,067.

The present invention relates to a third such method, a modification of the first method. Instead of providing a means to reject specularly reflected light from the sphere, a means is provided whereby the specular reflection takes place outside the integrating sphere.

In the past it has been proposed to eliminate the specularly reflected light by placing a lens of zero power or some similar form of adapter or "noflector" in contact with the surface of the sample so that all the specularly reflected light will be returned through the entrance window. This procedure, however, involves a number of serious limitations upon its practical use. First, it requires that the sample have a smooth surface, since specular reflection from irregular surfaces would be scattered to such an extent that it would not be readily returned. Secondly, since the specularly reflected light follows divergent paths the "noflector" ordinarily must have a curved surface to focus the light on the window and the sample therefor must be one adapted to be fitted over this curve. This limited the types of samples which could be so tested to those which are on a flexible surface which can be bent around a curve or to materials such as inks, paints, and pigments and the like which could be directly placed on the back of the zero power lens.

Figure 2:
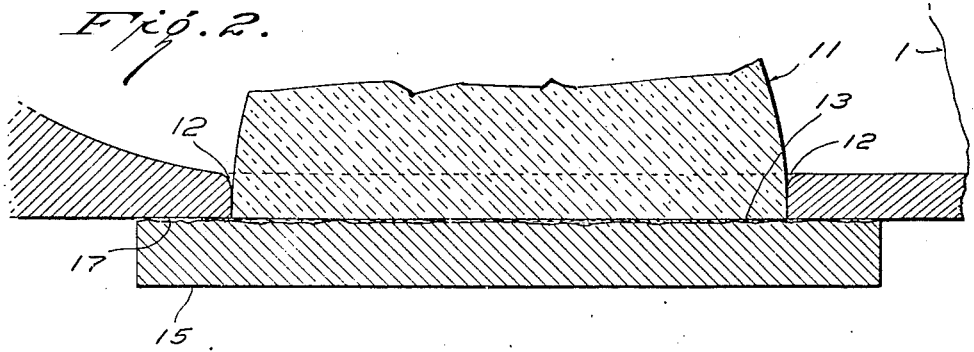

The present invention in general comprises the development and use of suitable adapters whereby the body reflectance of samples having appreciable specular reflectance may be evaluated whether the materials meet the requirements imposed by the prior art or not. The invention will be more fully discussed in connection with the drawing in which:

Figure 1 is a partially diagrammatic section of a conventional integrating sphere with the reference sample and sample to be tested in place showing the location of the adapter of the present invention; and Figure 2 represents a greatly enlarged portion of Figure 1 showing the oil layer in detail.

Some types of concave adapters, such for example, as those of my above-identified original application in which the thickness of the adapter is small relative to its diameter may be subject to objection on the basis that the concave surface of the adapter will increase the internal reflection of the sample assembly and cause the percent of reflectance recorded by the apparatus to be too low. While the error thus introduced is small, it may be substantially eliminated by the use of a modified adapter. One form of such adapter is illustrated for example in Figure 1.

Referring to the drawing, 1 represents the integrating sphere of a conventional flickering-beam type spectrophotometer having two light admitting windows 2 and 3 through which two divergent beams of plain polarized light, represented by lines 4 and 5 respectively, ordinarily enter the sphere. The source of these beams forms no part of the present invention, is conventional and is not shown. Beam 4 falls upon a standard reference sample 6, mounted in sample windows 7 by means of a spring clip 8 or some other equivalent holding means. Light falling on the reference sample 6, which is a block of magnesium carbonate or the like, is diffusely reflected into the interior of the sphere, being picked up by a phototube or photocell 9 in a conventional manner.

Beam 5 is shown as impinging on the front face 10 of an elongated, transparent adapter 11, which is mounted within and extends across the sphere 1, before the beam can enter the sphere. The adapter is shown as fitting snugly within and extending through window 3. The other end of adapter 11 is shown as fitting snugly within sample window 12, the face 13 of the adapter forming a substantially continuous surface with the outer face of a flattened portion 14 of sphere 1. A sample 15, the reflectance of which is to be tested is held against the outside of window opening 12, against face 13 of adapter 11 by means of spring clip 16 or some equivalent holding means.

Interposed between adapter 11 and sample 15 and making optical contact therewith is a thin layer of a suitable oil 17, having no appreciable spectral absorption and an index of refraction between that of the adapter and the sample itself. Adapter 11 may be held in place by any suitable means. In the drawing this is done by fitting the adapter within windows 3 and 12 and by making the adapter integral with the reflectance sample holder. Any other desirable adapter mounting system may be used, however.

The external shape of the adapter may be considerably modified without departing from the scope of the invention. The critical features are that the rejector surface of the adapter is located further away from the surface of the sample itself, thus subtending a smaller angle at the sample than in case of a thin adapter and the specularly reflecting face of the adapter is located outside the sphere. However, it is desirable to keep the amount of the diffusely reflected light which escapes from the sphere along the adapter at a minimum. This can be accomplished for example by tapering the adapter. By making the taper in one or more steps, as in adapter 11, a small angle may be substended at the sample without the cross-section at any point along the adapter being too small. The provision of these steps in addition to enabling the production of a physically stronger adapter, also increases the surface area from which the diffusely reflected light may escape from the adapter into the integrating sphere.

When using adapters, such as adapter 11, it may be necessary to compensate for the amount of light reflected from the front face of the adapter or absorbed in passing through it. This may be simply accomplished by reducing the standard beam. Any desired attenuating device for the standard beam may be used, perhaps the most convenient being a wedge diaphragm or a neutral filter. By running a blank on the apparatus using two similar samples, the machine may be readily adjusted so that equal amounts of light will fall on both samples.

Particularly important in connection with the present invention is the use of the oil layer 13. Its advantage is clearly shown in Figure 2. The oil layer effectively seals the joint between adapter and sample and thereby eliminates substantially all surface reflectance from the face of the sample whether specular or diffuse. Thus, a sample which has been accidentally scratched need not be rejected and samples which have matte, rough-ground or wavy surfaces as shown by the surface 17 in Figure 2 may be used without having their surfaces polished or otherwise modified as would have been necessary in carrying out any of the procedures proposed prior to the present invention.

It is a particularly advantageous feature of the present invention that it requires no permanent modification of the conventional apparatus. Thus, when it is not important to make allowance for the specular reflectance or when it is desired to use the machine to measure transmission samples, this may be readily done since the adapters disclosed herein need have no special mountings of such a nature as to interfere with the normal working of the machine.

Various modifications in the size and shape of the adapters may be readily made without departing from the scope of the present invention. The adapter itself may be made of any suitable transparent material such as glass or a polymerized acrylic resin. The presence of the oil thereon overcomes the necessity for having the surface of the adapter in contact with the oil an exact plane. The oil will overcome any slight irregularities in the adapter surface itself and will even permit the use, if so desired, of an adapter having both principal surfaces in the form of a curve. The latter type, however, is not as desirable as is an approximately flat surface since it is more difficult to place in the proper position. The diameter of the adapter is not critical. It must be sufficiently great so that the whole beam will fall on the surface of the adapter but otherwise may be of almost any desired size. A preferable diameter is one which though greater than the beam diameter is smaller than the sample window since this is the easiest size to properly position.

I claim:

In a flickering-beam type spectrophotometer, an integrating sphere having at least one opening for the admission of light into the sphere; at least one sample mounting window; a transparent adapter located in said window, said adapter having one face forming a substantially continuous surface with that portion of the external sphere surface surrounding and adjacent to said window, said adapter extending across the sphere, projecting through and fitting in said light-admitting opening, whereby specular reflectance from the face of the adapter occurs outside the sphere, and a mounting means adapted to hold a sample in contact with the surface formed by said adapter and sphere surface.

WILLIAM A. SHURCLIFF.